United States Patent Office 3,776,858
Patented Dec. 4, 1973

3,776,858
CATALYSTS
Bastiaan Adriaan Heide and Johannes Jacobus Muller, Rotterdam, and Theodorus Joannes Kock, Heenvliet, Netherlands, assignors to Lever Brothers Company, New York, N.Y.
No Drawing. Filed Dec. 1, 1971, Ser. No. 203,844
Claims priority, application Great Britain, Dec. 4, 1970, 57,649/70
Int. Cl. B01j
U.S. Cl. 252—431 R                    13 Claims

ABSTRACT OF THE DISCLOSURE

The specification describes interesterification catalysts comprising particles of a catalytically active alkali metal derivative, e.g. sodium ethoxide, immobilized by a substantially completely saturated solid fatty material, e.g. hydrogenated fat, soap or fatty acid wax.

The catalyst can be used for the interesterification of glycerides.

BACKGROUND OF THE INVENTION

Field of the invention

The invention relates to interesterification catalysts which are suitable for the interesterification of glycerides especially triglyceride.

The invention especially relates to interesterification catalysts in particulate form, e.g. flakes, noodles, pellets, tablets, granules, etc.

The invention also relates to a process for effecting catalytic interesterification of glycerides, especially triglyglycerides, using the catalysts of the invention.

In catalytic interesterification the fatty acid radicals present in the glycerides, which fatty acids generally differ both in number of carbon atoms and in degree of unsaturation, are rearranged and consequently the melting point, the dilatometric characteristics and other properties of the mixture of glycerides formed differ from those properties of the starting glyceride mixture.

By interesterification is meant the interchange of the fatty acid radicals of the glycerides on the glyceryl radicals in random fashion. This interchange continues dynamically when the oil is in liquid state until the mixture of molecular configurations reaches on equilibrium in accordance with the laws of probability. The term "molecular configuration" refers to the identity of the fatty acid radicals combined with the glyceryl radical.

Interesterification reactions can be carried out under conditions of temperature at which the entire mixture of glycerides is liquid (generally called "random interesterification") or partly crystallized (generally called "directed interesterification"). In the latter type of interesterification reaction the equilibrium in the liquid reaction medium will be disturbed when solid glycerides crystallize until a new equilibrium under the existing temperature conditions has been reached in said liquid medium.

In the interesterification of glycerides, such as vegetable and animal oils and fats, it is customary to use a powdered catalyst, e.g. an alkali metal alkoxide, in a quantity of up to at most 0.3% by weight of the glyceride mixture. Such powdered catalysts are difficult to handle, for instance, if the catalyst is exposed to the air at a temperature of above about 25° C. self-ignition can take place and in contact with the human skin burning of the skin can occur even at ambient temperature.

Up to now such powdered interesterification catalysts were either used as such or they were dispersed in a protective medium which was indifferent in respect of the catalyst. Sodium methyltae and ethylate, for instance, were usually dispersed in alcohols, such as methanol and the dispersion obtained was added to the oil blend to be interesterified. Owing to the presence of alcohols in the mixture to be interesterified, triglycerides were lost e.g. by the formation of methyl esters.

It was regarded to be highly unlikely that a powdered interesterification catalyst—when dispersed in a fatty material—could be stored for some time or even be prepared, because fatty material has always been regarded to be highly reactive in respect of the interesterification catalyst.

Description of the prior art

In the prior art the use of several catalysts e.g. alkali metals like sodium and alkali metal derivatives like sodium ethoxide and methoxide, has been described for interesterification of glycerides.

In Canadian patent specification 542,530 the interesterification of lard is described. Especially sodium is mentioned in said specification as an effective catalyst and preferably the sodium is added to the glyceride mixture to be treated in the form of a dispersion in, for example, inert hydrocarbons such as toluene, xylene, naphtha, kerosene, white oil, petroleum jelly, paraffin, and naphthalene or in an other organic medium which does not appreciably react with sodium at temperatures above the melting point of sodium.

Similarly in "Ind. and Eng. Chemistry," vol. 40, July 1948, pp. 1183–1190, the use of sodium methoxide as a concentrated methanol solution or a suspension of finely divided solid particles of sodium methoxide in xylene or other non-reacting solvents is described.

Although it is stated in this article that mixtures of cottonseed oil, sodium methoxide and xylene have sometimes been stored for months in sealed containers, the percentage of sodium methoxide used in such mixtures was no more than 0.2%, whereas the catalyst of the present invention contains at least about 5% and up to about 99% of alkali metal alkoxides immobilized in substantially completely saturated solid fatty material.

SUMMARY OF THE INVENTION

The present invention, provides an interesterification catalyst comprising particles of a catalytically active alkali metal derivative immobilized by a substantially completely saturated solid fatty material. This catalyst can be stored for weeks at ambient temperature without decreasing significantly in catalytic activity. In this specification, by "solid fatty material" is understood fatty acid triglycerides of a slip melting point of above 30° C., as well as fatty acid soaps and fatty acid waxes. By "waxes" are understood esters of saturated fatty acids and fatty alcohols.

The terms "immobilized" and "immobilizing" refer to dispersions of alkali metal derivatives in fatty material and to agglomerations of alkali metal derivatives with little fatty material.

It is essential that the fatty material used is substantially completely saturated and solid, otherwise polymerization and darkening of the fatty material will readily set in, probably on account of the presence of double bonds in the fatty acid radicals.

Suitable interesterification catalysts to be immobilized by the solid fatty material are alkali metal hydroxides or amides and particularly alkali metal alkoxides, preferably sodium alkoxides, particularly sodium alkoxides having 2 or 3 carbon atoms, such as sodium methoxide and sodium ethoxide.

Although these catalytically active alkali metal derivatives are generally called "catalysts" or "low temperature catalysts," the nature of the true active catalyst in the interesterification reaction—which may be a reaction product formed in situ from said "catalyst" during the interesterification treatment—is not yet fully understood.

In this specification by "catalysts" or "low temperature catalysts" is to be understood the alkali metal derivatives from which said unknown catalytic agent can or will be formed in situ during the interesterification process.

Suitable solid fatty materials in which the particles of the alkali metal derivatives can be immobilized are e.g. triglycerides of a slip melting point of 30° to 85° C., such as tallow, lard, stearines of vegetable and animal oils and substantially completely hydrogenated oils like hardened palm oil, coconut oil, palm kernel oil, cottonseed oil, sunflower oil, safflower oil, soybean oil, rapeseed oil and whale oil.

Substantially saturated fats like hardened palm oil of a slip melting point of 50°–60° C., hardened palm kernel oil of a slip melting point of 38°–42° C., hardened whale oil of a slip melting point of 50–70° C., hardened soybean oil of a melting point of 50°–70° C. and hardened rapeseed oil of a slip melting point of 65°–75° C. are particularly preferred.

The weight ratio of alkali metal derivative to fatty material can be from 0.05:1 to 100:1.

If fat is used as immobilizing agent a ratio of from 0.25:1 to 2:1 is particularly preferred.

The particle size of the alkali metal derivative is not very critical and can cover a range of from 1 to 2000 microns for at least 90% by weight of the particles of the alkali metal derivative, a particle size of 10 to 500 microns of at least 90% by weight of the particles being preferred.

It is convenient that the catalyst of the invention is in the form of flakes in which the particles of the alkali metal derivative are uniformly dispersed in a substantially completely saturated solid fat of a slip melting point of 50°–85° C., but other physical forms can be used as well, e.g. noodles, granules, pellets, ribbons and so on.

The interesterification catalyst of the invention can be in the form of a dispersion of particles of the alkali metal derivative in the fatty material or said particles can be agglomerated by a suitable proportion of the fatty material. Intermediate forms can of course exist as well.

The product of the invention can be prepared by immobilizing the catalytically active alkali metal derivative in a substantially completely saturated solid fatty material.

This immobilizing can be effected by dispersing particles of an alkali metal derivative in a liquefied substantially completely saturated solid fat and by cooling the dispersion thus obtained.

Care should be taken that the catalyst should not be subjected to temperatures above 30° C. for such a period of time that the activity of the fatty catalyst is significantly decreased.

The product is subjected to a temperature above 30° C. for no more than 1 hour, preferably less than 10 minutes.

Preferably the fatty catalyst is prepared by heating a substantially completely saturated solid fat of a slip melting point of 30°–85° C., particularly hardened palm oil of a slip melting point of 50° to 60° C., to a temperature above its melting point, which is about 55°–70° C. in case of palm oil and dispersing particles of the alkali metal derivative, especially sodium methoxide of a particle size of 50–110 microns in the heated fat and cooling the dispersion obtained to a temperature below the melting point of the fat, e.g. 5°–30° C.

Preferably the cooling of the dispersion is effected by means of a rotating cooling drum from which flakes of the catalyst of the invention can be scraped off.

The flakes obtained can be packed in any desirable package, such as bags, boxes, containers, drums, etc. and can be stored in suitable bins with hopper bottoms, if desired.

The flakes are free-flowing and can be conveniently handled.

The process can also be effected by blending particles of the catalytically active alkali metal derivative with particles of the solid fatty material, the weight ratio of the alkali metal derivative and the fatty material being from 0.05:1 to 100:1, and immobilizing the alkali metal derivative particles by compressing the blend into a suitable dosable form.

If the fats, soaps or waxes which are used for the purpose of the invention contain catalyst poisons (e.g. water and free fatty acids) in such proportions that a substantial proportion of the dispersed catalyst is inactivated, at least the major part of such poisons should preferably be removed before the alkali metal derivative is dispersed therein. Since water and free acids are the principal catalyst poisons, it is preferred to carefully neutralize the fatty material and to reduce the water content to a level of below 0.05%, preferably below 0.015%, and in particular below 0.01% by weight before the catalyst is dispersed therein.

Although the drying step can be effected in several ways, when a deacidification process by distillation is carried out, as is usual in the edible oils industry, supplementary drying is not as a rule necessary for the purpose of the present invention. Drying may alternatively be done by treating the fatty material at an elevated temperature with a dry inert gas.

Prior to dispersing the catalyst in the fatty material, it is also preferred to deacidify the fatty material, especially in the case of fats to an acid value of less than 0.3, preferably less than 0.1. By "acid value" is to be understood the number of milligrammes of potassium hydroxide which it takes to neutralize 1 g. of the fat. The acid value is determined by the process described by H. A. Boekenoogen, "Analysis and Characterization of Oils, Fats, and Fat Products," vol. I, 1964, Interscience Publishers, London, pp. 23–24. Since this determination is carried out at ambient temperature in a short space of time, the esters are not saponified, so that an acid value of 0 is obtained in the absence of free acids.

Fats can be deacidified by using a process of deacidification by distillation in vacuo, but it can also be done by direct contact with an alkaline solution, by which soaps are formed which can be separated by the difference in specific gravity between the fat and the soap. Such alkali deacidification can for instance be carried out by means of a 0.2 to 8 N sodium hydroxide solution.

The process according to the invention will now be illustrated by the following examples (all percentages and parts are by weight).

EXAMPLE I 50 grams of fully hydrogenated palm oil of a slip melting point of 58° C., an iodine value of 3.0, a water content of 0.01% and an acid value of 0.1 were heated in a tin to 65° C.

50 grams of sodium methoxide (ex Merck, molecular weight 54.02) of a particule size of 50 to 110 microns, were added to the heated fat.

The mixture was stirred and the homogeneous mass obtained was rapidly cooled to a temperature of 20° C. and the tin was closed by a lid.

The sodium methoxide had been subjected to a temperature of above 30° C. for about 8 minutes.

The fatty catalyst obtained was used for interesterification of a mixture of glycerides directly after preparation and 14 weeks later. It was observed that the activity of the catalyst remained practically unchanged after 14 weeks' storage.

EXAMPLE II 400 grams of fully hydrogenated palm oil of a temperature of 65° C. were mixed with 40 grams of sodium methoxide. Both the palm oil and methoxide were the same as used in Example I.

The mixture was stirred and the homogeneous mass was cooled within 5 minutes after mixing to a temperature of about 20° C. over a cooled rotating drum of a surface temperature of 20° C.

The residence time on the cooling drum was about 50 seconds. After crystallization of the fat the mass was scraped off from the drum by means of a knife.

The flaked fatty catalyst obtained was packed in N₂ atmosphere in plastic bags which were heat-sealed.

The activity of the catalyst was tested by random interesterification. After 3 weeks' storage of the catalyst practically no change in activity could be observed.

EXAMPLE III

Example II was repeated under identical conditions, except that the sodium methoxide was now dispersed in hydrogenated soybean oil of a melting point of 69° C. and an iodine value of 2.0. The catalyst obtained was still reactive after 3 weeks' storage.

EXAMPLE IV

Example I was repeated under identical conditions, except that 25% of sodium methoxide was now dispersed in hydrogenated palmkernel oil of a melting point of 39° C. and an iodine value of 1.5 (ratio methoxide:fat =0.33:1). The catalyst obtained was successfully used for interesterification of glycerides after the catalyst had been stored for 3 weeks.

EXAMPLE V

Example I was repeated under identical conditions, except that now 25% of sodium ethoxide (ex Dynamit Nobel AG Werk Lülsdorf), of a particle size of between 10 and 200 microns, wasc dispersed in hydrogenated palm oil of a slip melting point of 58° C. and an iodine value of 3.0 (ratio ethoxide:fat=0.33:1). The catalyst obtained was successfully used for interesterification of glycerides after the catalyst had been stored for 2 weeks.

EXAMPLE VI

Example V was repeated, except that the weight ratio of sodium ethoxide to fat was 1. The activity of the catalyst was tested directly after preparation and after 1 week storage. No difference could be observed.

EXAMPLES VII–X

Sodium ethoxide (of the same physical properties as the product used in Example V) was compressed into tablets of a diameter of 7 mm. and a height of about 3 mm. Sodium stearate of an iodine value of 0 was used as "immobilizing agent." The following weight ratios (ethoxide:stearate) were used:

| | |
|---|---|
| Example VII | 100 |
| Example VIII | 10 |
| Example IX | 2 |
| Example X | 1 |

The tablets were prepared by compressing mixtures of ground sodium stearate and sodium ethoxide powder in an "Indola HOCO-KJ" tableting machine. The tablets obtained were packed under nitrogen atmosphere in plastic bags which were subsequently heat-sealed.

After 6 weeks' storage the tablets were used for interesterification of a triglyceride mixture.

The tablets were still catalytically active.

EXAMPLES XI–XIII

Tablets were prepared and packed as described in Examples VII–X, except that particles of sodium ethoxide (having the same physical properties as tthe product used in Example V) and ground hydrogenated palm oil of a slip melting point of 58° C. and an iodine value of 3.0 were used (palm oil of the same batch as used in Example I was applied). The tablets were prepared from the following weight ratios (ethoxide:fat):

| | |
|---|---|
| Example XI | 5 |
| Example XII | 1 |
| Example XIII | 0.5 |

The tablets could be used for interesterification of glyceride mixtures after 6 weeks' storage.

EXAMPLES XIV–XVII

Examples VII–X were repeated, except that now dried and deacidified cetyl-palmitate of a slip melting point of 51° C. and an iodine value of 2.5 was used as immobilizing agent.

The tablets were prepared from the following weight ratios (ethoxide:cetyl-palmitate):

| | |
|---|---|
| Example XIV | 10 |
| Example XV | 5 |
| Example XVI | 2 |
| Example XVII | 1 |

The tablets could be used for interesterification of glyceride mixtures after 6 weeks' storage.

Although in the previous Examples I–XVII interesterification catalysts consisting essentially of sodium methoxide and sodium ethoxide immobilized by either fats of a melting point between 30° and 85° C. or sodium stearate or cetyl-palmitate in weight ratios of alkoxide:fatty material within the range of 0.05:1 to 100:1 have been described, similar results are obtained if other alkali metal alkoxides, e.g. potassium or lithium alkoxides from other alcohols like isopropanol, butanol or ethylene glycol are used, which alkoxides are immobilized by e.g. palmitates of sodium or potassium or waxes like nonyl stearate, stearoyl stearate, etc.

We claim:

1. Interesterification catalyst consisting essentially of particles of an alkali metal alkoxide immobilized by a substantially completely saturated solid fatty material selected from the group consisting of a fatty acid soap, a fatty acid triglyceride and a fatty acid wax, the weight ratio of said alkali metal alkoxide to said fatty material being from 0.05:1 to 100:1.

2. Interesterification catalyst according to claim 1, in which the alkali metal derivative is sodium alkoxide.

3. Interesterification catalyst according to claim 1 in which the alkoxide has 2 or 3 carbon atoms.

4. Interesterification catalyst according to claim 1, in which the fatty material is a fat of a slip melting point of 30°–85° C.

5. Interesterification catalyst according to claim 4, in which the fat has an iodine value of 0 to 10.

6. Interesterification catalyst according to claim 4, in which the fat is hardened palm oil of a slip melting point of 50°–60° C., hardened palm kernel oil of a slip melting point of 38°–42° C., hardened whale oil of a slip melting point of 50°–70° C., hardened soybean oil of a slip melting point of 50°–70° C. or hardened rapeseed oil of a slip melting point of 65°–75° C.

7. Interesterification catalyst according to claim 4, in which the weight ratio of alkali metal derivative to fat is from 0.25:1 to 2:1.

8. Interesterification catalyst according to claim 1, in which at least 90% by weight of the particles of the alkali metal derivative have a particle size of 1 to 2,000 microns.

9. Interesterification catalyst according to claim 8, in which the particle size is from 10 to 500 microns.

10. Interesterification catalyst according to claim 4, in which the particles of the alkali metal derivative are uniformly dispersed in flakes of a substantially completely saturated solid fat of a slip melting point of 50°–85° C.

11. Process for preparing an interesterification catalyst which comprises immobilizing particles of an alkali metal alkoxide by a substantially completely saturated solid fatty material selected from the group consisting of a fatty acid soap, a fatty acid triglyceride and a fatty acid wax, the weight ratio of said alkali metal alkoxide to said fatty material being from 0.05:1 to 100:1.

12. Process according to claim 11, which comprises heating a substantially completely saturated fat of a slip melting point of 30°–85° C. to a temperature above its melting point, dispersing particles of the alkali metal derivative in the heated fat and cooling the dispersion obtained to a temperature below the melting point of the fat.

13. Process according to claim 11, which comprises heating hardened palm oil of a slip melting point of 50° to 60° C. to a temperature of 55° to 70° C., dispersing sodium methoxide of a particle size of 50 to 110 microns in said heated palm oil, cooling and flaking the dispersion obtained at a temperature of 5° to 30° C., the weight ratio of sodium methoxide to palm oil being from 0.25:1 to 2:1.

References Cited

UNITED STATES PATENTS

| | | | |
|---|---|---|---|
| 2,726,158 | 12/1955 | Cochran et al. | 260—410.7 X |
| 2,855,311 | 10/1958 | Nelson | 260—410.7 X |
| 2,872,463 | 2/1959 | Van Akkeren | 260—410.7 |
| 2,878,274 | 3/1959 | Van Akkeren | 260—410.7 |
| 2,879,281 | 3/1959 | Brokaw | 252—431 C X |
| 2,914,546 | 11/1959 | Barsky et al. | 260—410.7 |
| 2,928,745 | 3/1960 | Roylance | 260—410.7 X |
| 3,232,971 | 2/1966 | Stein et al. | 260—410.7 |
| 2,442,531 | 6/1948 | Eckly | 260—410.7 |

HELEN M. S. SNEED, Primary Examiner